July 11, 1967 J. A. BOTT 3,330,454
LUGGAGE RACK
Filed Aug. 31, 1965 8 Sheets-Sheet 1

INVENTOR.
John A. Bott.
BY Harness, Dickey & Pierce
ATTORNEYS.

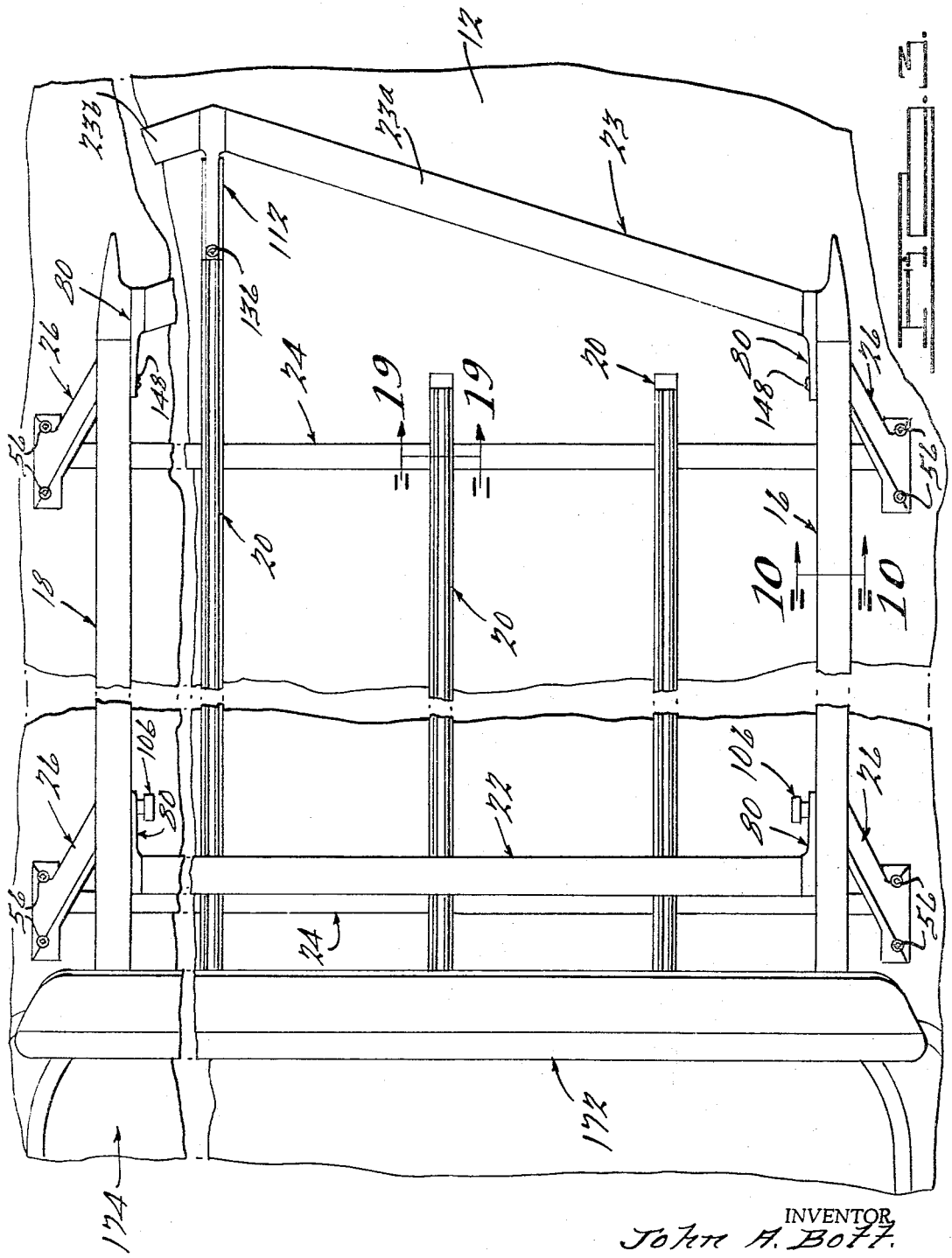

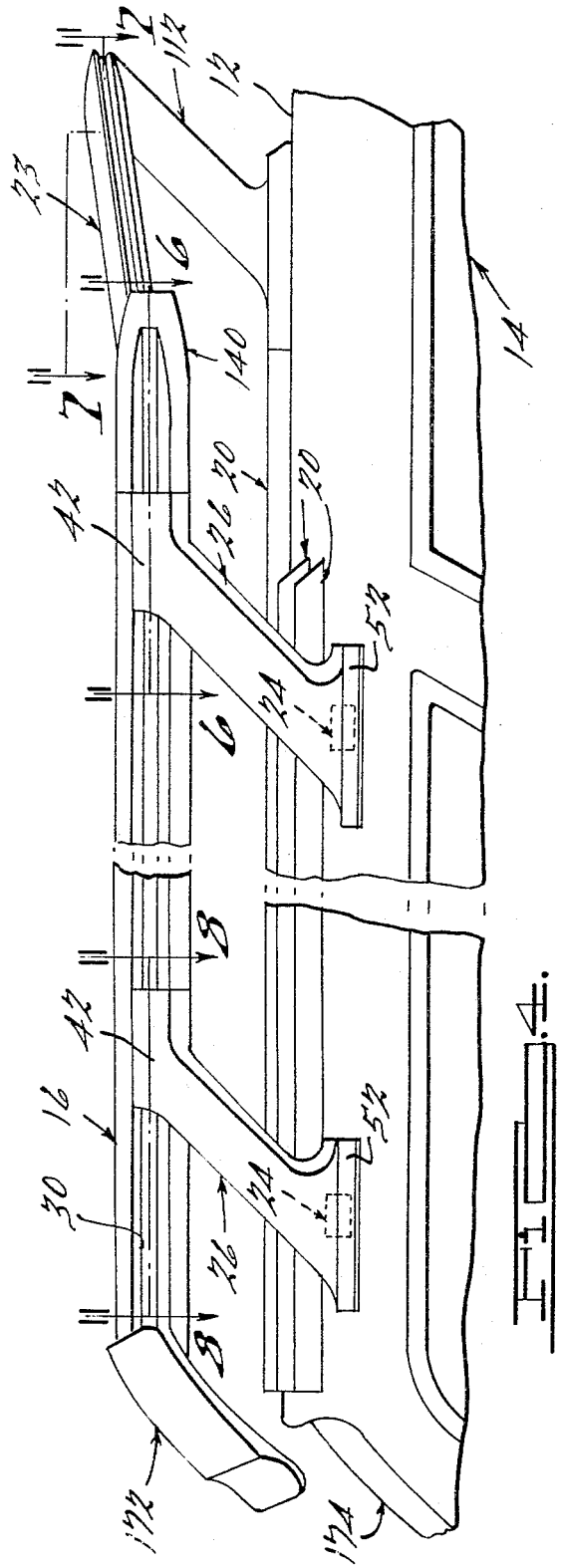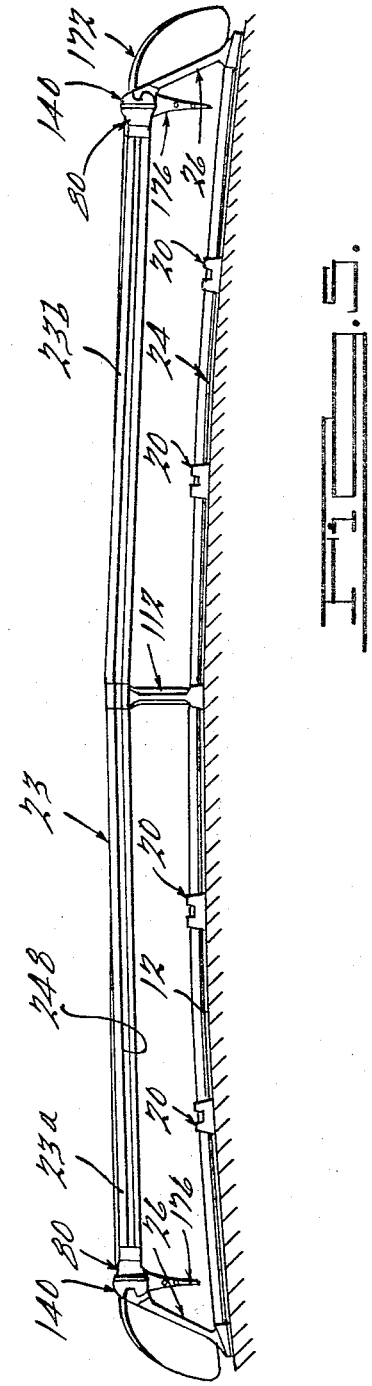

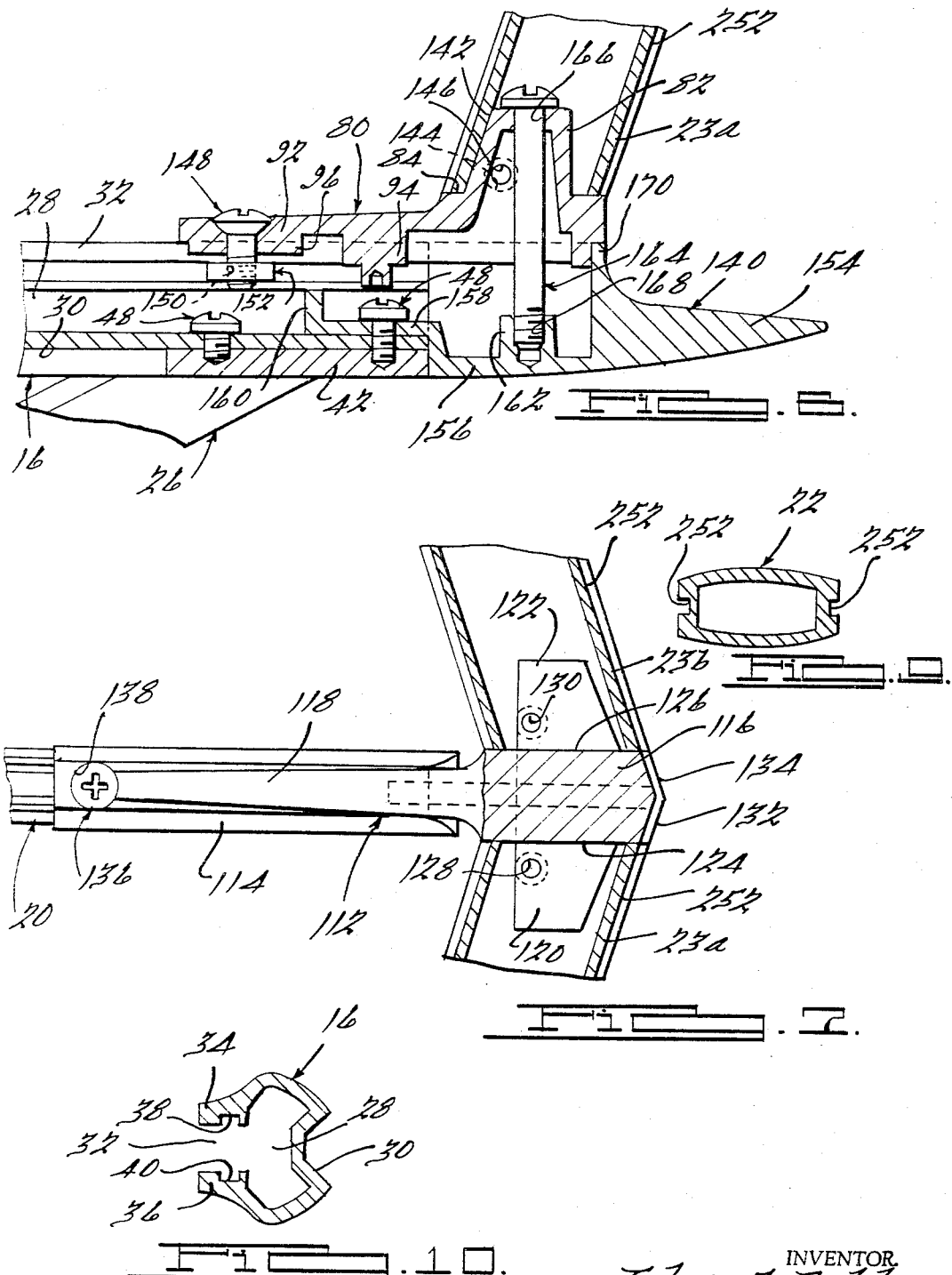

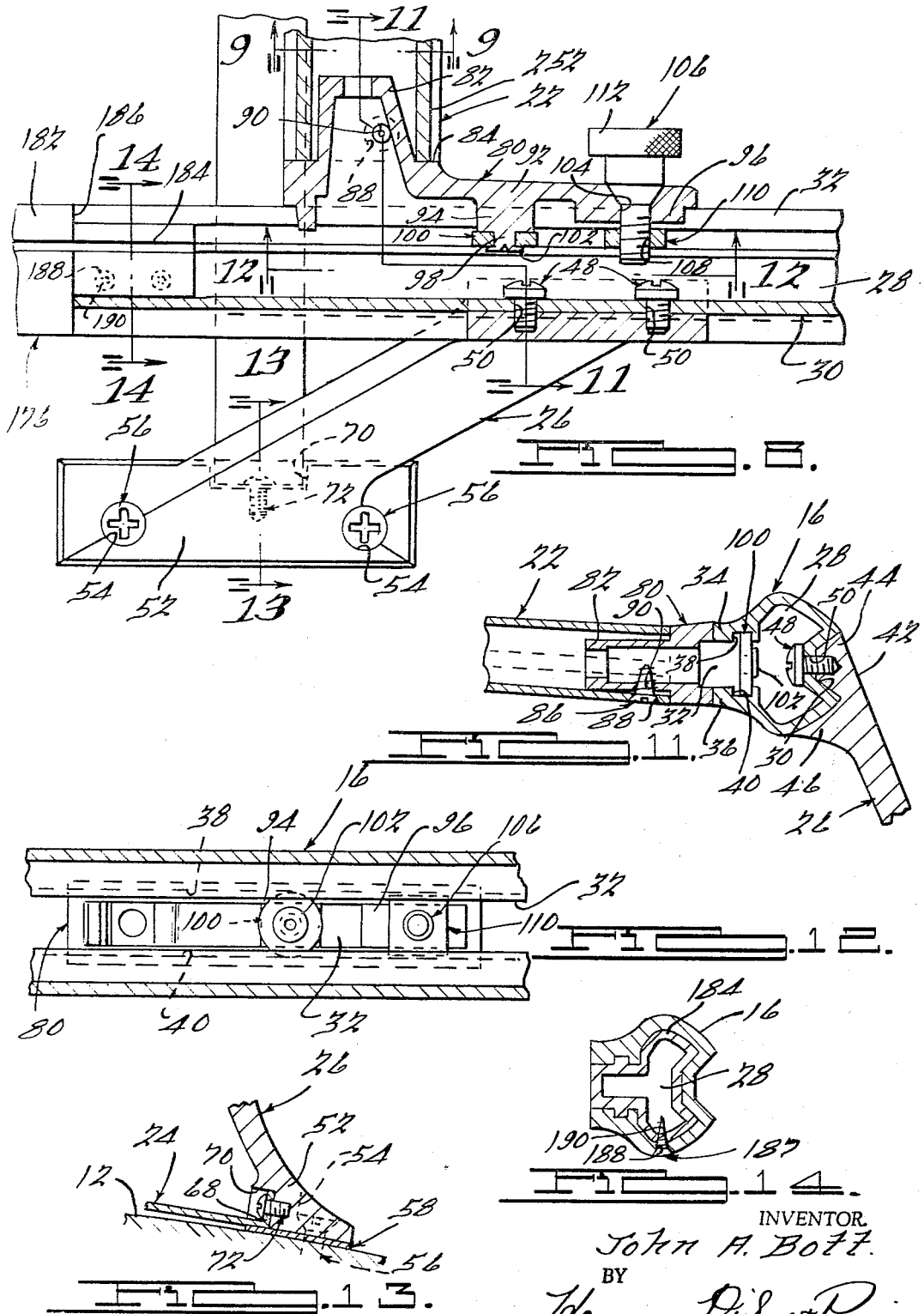

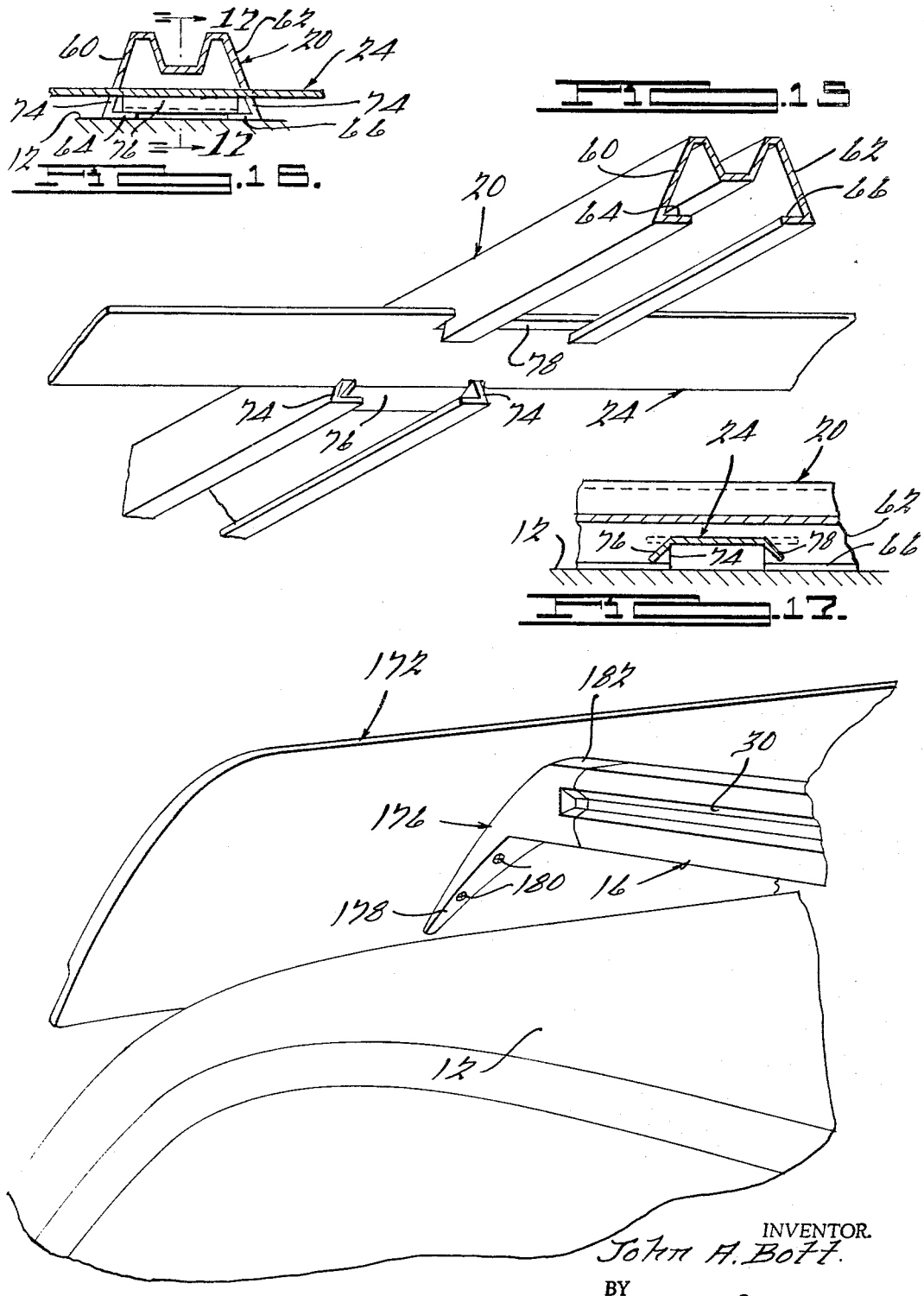

July 11, 1967 J. A. BOTT 3,330,454
LUGGAGE RACK
Filed Aug. 31, 1965 8 Sheets-Sheet 7

INVENTOR.
John A. Bott
BY
Harness, Dickey & Pierce
ATTORNEYS

July 11, 1967 J. A. BOTT 3,330,454
LUGGAGE RACK
Filed Aug. 31, 1965 8 Sheets-Sheet 8
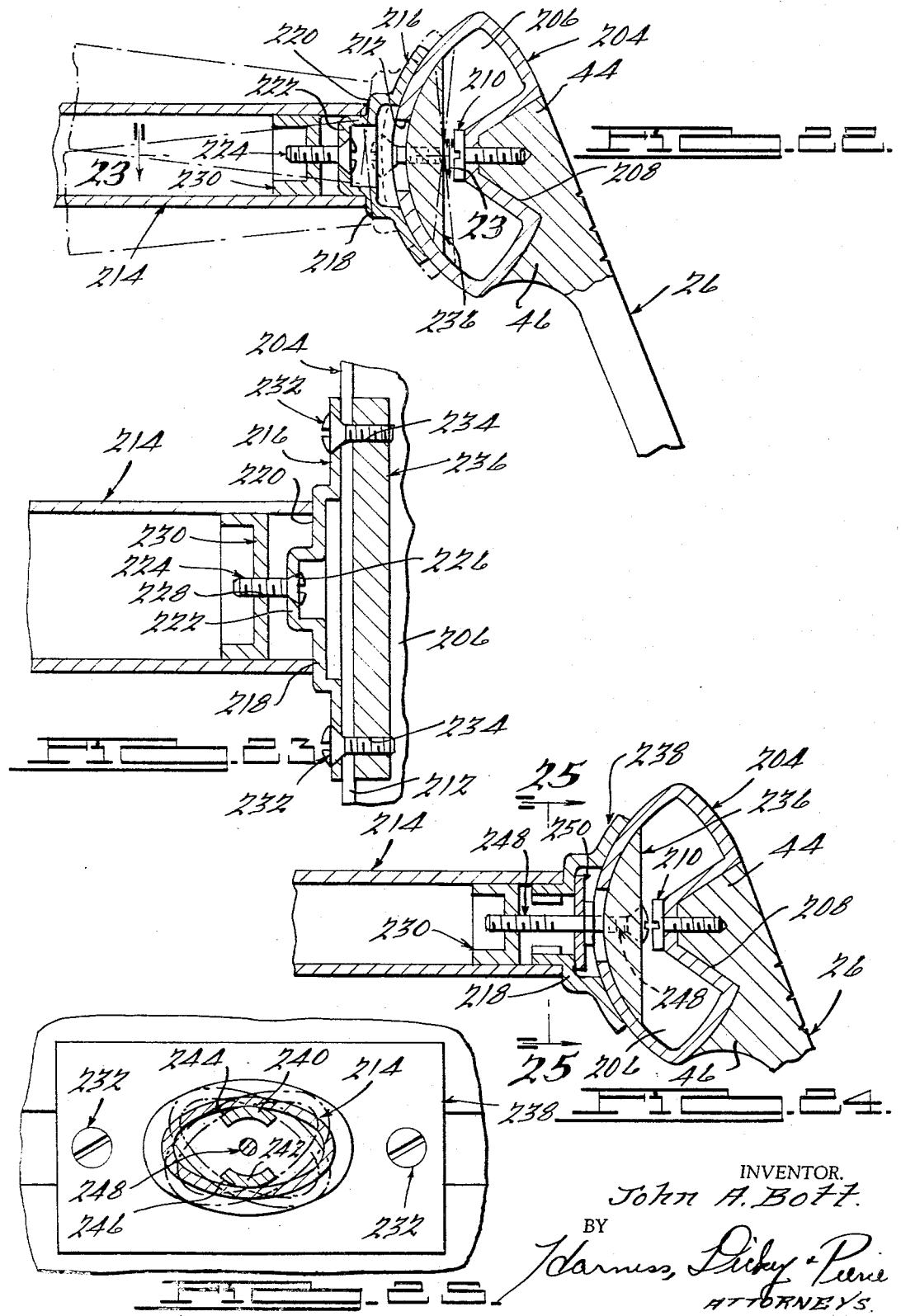
INVENTOR.
John A. Bott.
BY
Harness, Dickey & Pierce
ATTORNEYS

United States Patent Office 3,330,454
Patented July 11, 1967

3,330,454
LUGGAGE RACK
John A. Bott, 931 Lake Shore Drive,
Grosse Pointe Shores, Mich. 48236
Filed Aug. 31, 1965, Ser. No. 483,915
17 Claims. (Cl. 224—42.1)

This invention relates generally to means for carrying luggage and the like on automotive vehicles and, more particularly, to a new and improved luggage rack construction adapted to be operatively mounted on the roof of an automotive vehicle.

The luggage rack of the present invention employs a pair of side rails which extend longitudinally along the opposite sides of the roof of an automotive vehicle. The side rails are of uniform cross section and have outwardly facing channels or nonplanar surfaces which are matingly engageable with the upper ends of a plurality of stanchions which serve to support the rack upon the vehicle roof. By this means, the stanchions may be connected to the side rails at almost any desirable longitudinal position. The side rails are interconnected by a pair of cross rails, at least one of which is longitudinally adjustable with respect to the other, whereby to vary the size of the space bounded by the side rails and cross rails in accordance with the size and type of load being transported. The ends of the aforesaid side rails are provided with suitable end caps or with mounting brackets for supporting a wind deflector which can be mounted on the luggage rack at the rear end thereof.

It is accordingly a general object of the present invention to provide a new and improved luggage rack in which any number of stanchions may be readily secured to the longitudinally extending side rails and at virtually any desirable longitudinal position therealong.

It is another object of the present invention to provide a new and improved luggage rack of the above character which is constructed of standard components that may be cut to various desired lengths to accommodate luggage racks specifically designed for different vehicles, thereby minimizing the special tooling and accompanying expenses required to fabricate specific luggage racks for each type of vehicle and vehicle model.

It is still another object of the present invention to provide a new and improved luggage rack of the above character which may have its ornamental appearance changed by merely varying the size and configuration of the end caps provided on the opposite ends of the side rails thereof, which changes are possible without requiring any retooling for the remaining luggage rack components.

It is a further object of the present invention to provide a new and improved luggage rack of the above character which features novel and inexpensive means for interconnecting the various components thereof without exposing the fastening means employed.

It is yet another object of the present invention to provide a new and improved luggage rack of the above character wherein the brackets for interconnecting the cross rails to the side rails are universally angularly adjustable relative to one another whereby to accommodate vehicle roofs of various contours.

It is another object of the present invention to provide a luggage rack of the above character wherein one or more of the cross rails may be angularly adjusted to minimize wind noise.

It is still another object of the present invention to provide a new and improved luggage rack of the above character which particularly lends itself to the use of superior metals which are light-weight, rust-proof and pleasant in appearance.

It is yet a further object of the present invention to provide a luggage rack of the above character which is adapted to be easily secured or mounted on the roof of an automotive vehicle.

It is still another object of the present invention to provide a luggage rack of the above character which is strong, easily assembled, reasonable in cost and which is durable in construction.

Other objects and advantages of the present invention will be apparent from the following detailed description taken in conjunction with the accompanying drawings, wherein:

FIGURE 3 is an enlarged top elevational view, partially broken away, of the luggage rack shown in FIGURES 1 and 2;

FIGURE 4 is an enlarged side elevational view, partially broken away, of the structure illustrated in FIGURE 3;

FIGURE 5 is a front end view on a reduced scale of the structure illustrated in FIGURE 4;

FIGURE 6 is an enlarged fragmentary cross sectional view taken along the line 6—6 of FIGURE 4;

FIGURE 7 is an enlarged fragmentary cross sectional view taken along the line 7—7 of FIGURE 4;

FIGURE 8 is an enlarged fragmentary cross sectional view taken along the line 8—8 of FIGURE 4;

FIGURE 9 is a transverse cross sectional view taken along the line 9—9 of FIGURE 8;

FIGURE 10 is a transverse cross sectional view taken along the line 10—10 of FIGURE 3;

FIGURE 11 is an enlarged fragmentary cross sectional view taken along the line 11—11 of FIGURE 8;

FIGURE 12 is a fragmentary cross sectional view taken along the line 12—12 of FIGURE 8;

FIGURE 13 is a fragmentary cross sectional view taken along the line 13—13 of FIGURE 8;

FIGURE 14 is a transverse cross sectional view taken along the line 14—14 of FIGURE 8;

FIGURE 15 is a fragmentary perspective view of a section of one of the luggage supporting base rails incorporated in the luggage rack illustrated in FIGURES 1, 2 and 3.

FIGURE 16 is a fragmentary cross-sectional view of the structure illustrated in FIGURE 15;

FIGURE 17 is a fragmentary cross-sectional view taken along the line 17—17 of FIGURE 16;

FIGURE 18 is an enlarged fragmentary perspective view of a portion of the wind deflector and mounting means therefor incorporated in the luggage rack illustrated in FIGURES 1, 2 and 3.

FIGURE 19 is a side elevational view of a modified construction of the luggage rack of the present invention, as shown operatively mounted on a truck vehicle or the like;

FIGURE 22 is an enlarged side elevational view, partially broken away, of a modified conntruction of the present invention;

FIGURE 23 is a fragmentary cross-sectional view taken along the line 23—23 of FIGURE 22;

FIGURE 24 is a view similar to FIGURE 22 and illustrating another modified construction of the present invention; and FIGURE 25 is a fragmentary cross-sectional view taken along the line 25—25 of FIGURE 24.

Figure 1:
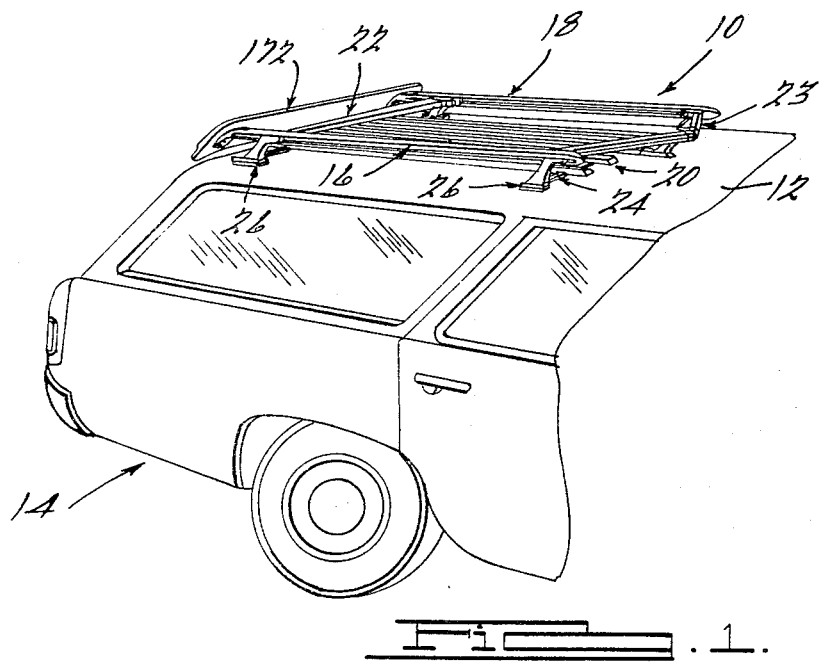
FIGURE 1 is an elevated perspective view of the luggage rack of the present invention mounted on the roof of a partially illustrated automotive vehicle.
Figure 2:
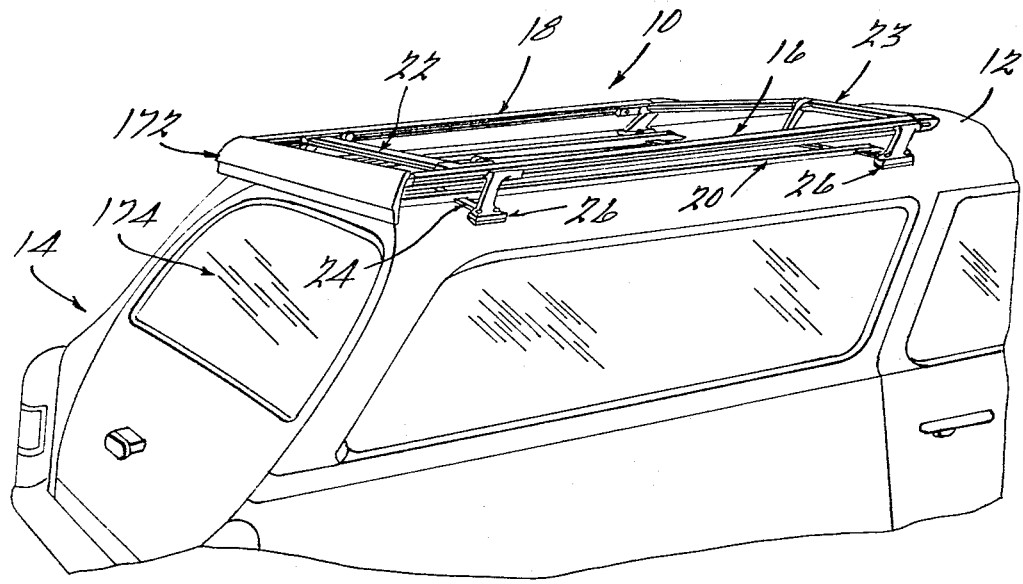
FIGURE 2 is another elevated perspective view of the luggage rack of the present invention on a somewhat larger scale than that shown in FIGURE 1.

Referring now to FIGURES 1 and 2 of the drawings, a luggage rack 10, constructed in accordance with an exemplary embodiment of the present invention, is shown operatively mounted on a substantially flat roof portion 12 of a conventional automotive vehicle 14. The luggage rack 10 includes a pair of identical elongated spaced parallel side rails 16 and 18 which extend longitudinally of the roof portion 12 along the opposite sides thereof. The luggage rack 10 also includes a plurality of longitudinally extending base rails, generally designated 20, and transversely or laterally extending cross rails 22, 23 and base rail support straps 24 which, together with the side rails 16 and 18, are secured to the roof portion 12 by means of a plurality of laterally and longitudinally spaced stanchions, generally designated by the numeral 26.

As best seen in FIGURES 10 and 11, the side rails 16 and 18 are generally tubular in transverse cross section and define elongated central cavities 28. The outboard sides of the rails 16 and 18 are formed with longitudinally extending, generally V-shaped channels 30, and the inboard sides of the rails 16, 18 are formed with longitudinal openings 32 which are communicable with cavities 28 and above and below which vertically spaced, laterally inwardly projecting and longitudinally extending flange sections 34 and 36, respectively, are formed. The lower and upper sides of the flange sections 34 and 36, respectively, are formed with vertically aligned grooves or recesses 38 and 40 which are coextensive of the rails 16, 18 and function in a manner later to be described.

As best seen in FIGURES 4, 8, 11 and 13, the side rails 16 and 18 are supported upon the roof portion 12 of the automotive vehicle 14 by the plurality of upwardly extending and forwardly and inwardly inclined stanchions 26, the upper ends of which are formed with side rail engaging sections 42 that are complementary to and adapted to contiguously engage the outboard sides of the side rails 16 and 18. In particular, the sections 42 include upper portions 44 adapted to contiguously engage the channels 30 and lower portions 46 which are adapted to contiguously engage the lower outboard sides of the side rails 16, 18 in the manner illustrated in FIGURE 11. It will be seen that since the side rails 16 and 18 are of uniform cross section along their entire lengths, the stanchions 26 are adapted to engage and be rigidly secured to the side members at substantially any desired longitudinal location along the rails 16 and 18, whereby to provide flexibility and universality of installation. As best illustrated in FIGURES 8 and 11, the upper end sections 42 of each of the stanchions 26 is secured to its associated side rail 16 or 18 by means of a pair of suitable screws, bolts or the like 48 which extend through suitable openings 50 in the inboard ends of the channels 30, suitable access to the screws 48 being provided through the longitudinally extending openings 32 and cavities 28 to facilitate assembly and disassembly of the stanchions 26 and side rails 16, 18.

The lower end of each of the stanchions 26 is formed with a generally rectangular shaped base section 52 which, as best illustrated in FIGURES 8 and 13, is adapted to bear upon the roof portion 12 of the vehicle 14 to support the luggage rack 10 thereon. The base sections 52 are formed with longitudinally spaced countersunk bores 54 through which suitable screws, bolts or the like 56 extend for rigidly securing the stanchions 6 to the roof portion 12. Suitable gasket members 58, which have substantially the same conformation as the base sections 52 and are constructed of a resilient and deformable material such as rubber or the like, are provided interjacent the lower side of each of the stanchion base sections 52 and the roof portion 12, as best seen in FIGURE 13.

As illustrated in FIGURES 1 through 3, the plurality of longitudinally extending base rails 20 are laterally spaced between the side rails 16 and 18 and are mounted directly above the upper surface of the roof portion 12 of the automotive vehicle 14. As seen in FIGURES 15 through 17, each of the base rails 20 is generally M-shaped in transverse cross section and comprises inclined outer sides 60 and 62 which terminate at their lower sides in laterally inwardly extending flange sections 64 and 66, respectively. The plurality of base rails 20 are adapted to be secured to the luggage rack 10 by means of two longitudinally spaced base rail support straps 24 which extend transversely between the base sections 52 of the front and rear laterally aligned pairs of stanchions 26. As best seen in FIGURE 13, the outer ends of the straps 24 are bent 90° upwardly, as seen at 68, and are nested within generally rectangular shaped recesses 70 formed in the inboard sides of the base sections 52 of the stanchions 26, the upturned end sections 68 being rigidly secured within the recesses 70 by suitable screws, bolts or the like 72. It will be noted that the lower sides of the straps 24 are spaced slightly above the upper surface of the roof portion 12, as best seen in FIGURE 13.

The base rails 20 and support straps 24 are rigidly interconnected by means of a plurality of interengageable notches or recesses formed in the members 20 and 24, as best illustrated in FIGURES 14 through 16. In particular, at the intersection of each of the base rails 20 and the support straps 24, the side sections 60, 62 and flange sections 64, 66 of the base rail members 20 are cut away, as best seen at 74 in FIGURES 16 and 17. At the same intersection locations, the transversely extending support straps 24 are cut away along their opposite edges in a manner such that a pair of deformable tab sections 76 and 78 are formed. The cut away sections 74 of the base rails 20 are of substantially the same length as the widths of the straps 24 after the straps 24 have been cut to form the sections 76, 78, whereby the sections 74 of the base rail members 20 are adapted to have the cut away sections of the straps 24 nested therewithin, as best seen in FIGURE 15. After the members 20 and 24 have been thus assembled, the tab sections 76 and 78 may be deformed downwardly from the position illustrated by the dotted lines in FIGURE 17 to the position illustrated by the solid lines in this figure, whereby the sections 76, 78 engage the flange sections 64 and 66 to lockingly secure the base rail members 20 to the support straps 24 and thus preclude any relative lateral or longitudinal movement between these members.

Referring now to FIGURES 3 and 8, the cross rail 22 extends transversely between the rear ends of the side rails 16 and 18 and is adapted to be adjustably secured at its opposite ends thereto, whereby to vary the size of the space bounded by the side rails 16 and 18 and the cross rails 22 and 23 extending laterally therebetween. More particularly, the opposite ends of the cross rail 22 are secured to the inboard sides of the side rails 16 and 18 by means of a pair of retainer or support brackets, one of which is illustrated in FIGURE 8 and designated by the numeral 80. The bracket 80 is formed with a laterally inwardly projecting lug portion 82 that is adapted to be inserted within the adjacent end of the cross rail member 22 which, as illustrated in FIGURE 9, is generally oval shaped in transverse section. A generally flat shoulder 84 extends outwardly around the outboard end of the lug portion 82 and is adapted to have the end of the cross rail 22 abut thereagainst. The end of the cross rail 22 is rigidly secured to the bracket 80 by means of a suitable locking screw, bolt or the like 86 which extends upwardly through a suitable countersunk aperture 88 in the lower side of the cross rail 22 and threadably engages a suitable opening 90 in the lower side of the lug portion 82, as best seen in FIGURE 11.

As seen in FIGURE 8, the retaining bracket 80 includes a forwardly projecting section 92 which is adapted to be adjustably secured to the inboard side of the side rail 16, the section 92 being of substantially the same height as the inboard dimensions of the side rail 16 so that a substantially smooth and pleasant appearing contour is provided between these members upon assembly thereof. The section 92 is provided with a pair of outwardly extending boss portions 94 and 96 which are longitudinally aligned and adapted to be nested within the longitudinally extending opening 32 defined between the upper and lower flange sections 34 and 36 of the side rail 16. The rearmost boss portion 94 is formed with an outwardly projecting reduced size section 98 upon which an annular washer 100 is carried, the washer 100 being slightly thinner in section than the vertically aligned grooves 38 and 40 in the flange sections 34, 36 and being slidably carried within the grooves 38, 40, as best seen in FIGURES 11 and 12. The outermost end of the section 98 is peened or crimped radially outwardly as seen at 102 in FIGURE 8 whereby to secure the washer 100 on the boss portion 94. An outwardly directed bore 104 is formed in the forwardmost end of the section 92 of the bracket 80, which bore is countersunk at its inboard end and extends laterally outwardly through the boss portion 96, as seen in FIGURE 8. An externally threaded screw, bolt or the like 106 is rotatably mounted within the bore 104 and is adapted to threadably engage a central bore 108 formed in a rectangularly shaped slide member 110 which is slidably carried within the grooves 38 and 40 of the side rail 16 and is adapted to be inserted into the grooves 38, 40 from the end of the side rail 16 prior to assembly of the luggage rack 10. The screw 106 is provided with an enlarged, externally knurled head section 112 which facilitates manual tightening thereof. It will be seen that as the screw 106 is tightened, the slide member 110 will be drawn laterally inwardly toward the boss portion 96 whereby to compress the portion of the flange sections 34 and 36 interjacent with the grooves 38 and 40 and the inboard ends of the flange sections 34 and 36, thus tightly securing the bracket 80 and hence the adjacent end of the cross rail 22 to the side rail 16. Upon loosening the screw 106, the bracket 80 may be longitudinally adjusted along the side rail 16 to facilitate positioning the cross rail 22 at any desired longitudinal location along the side rail 16, as will be apparent.

As best seen in FIGURES 1 through 3, the cross rail 23 which extends laterally between the forward ends of the side rails 16 and 18 comprises right and left sections, 23a and 23b, each of which extends half-way across the roof portion 14 of the vehicle 12. The inboard ends of the sections 23a and 23b intersect at a position slightly forwardly of the outboard ends thereof, which inboard ends are supported upon the roof portion 12 by a center stanchion member best illustrated in FIGURES 4 and 7 and generally designated by the numeral 112. The stanchion 112 generally comprises a lower mounting section 114 and an upper cross rail support section 116 between which a forwardly and upwardly inclined medial section 118 extends and is integrally connected therewith. The upper cross rail support section 116 is formed with a pair of laterally outwardly projecting tongue or lug portions 120 and 122 which, as illustrated in FIGURE 7, are slightly smaller in cross section than the interior of the cross rail sections 23a and 23b. The inboard ends of the sections 23a, 23b are adapted to fit over the lug portions 120 and 122 and abut against spaced parallel surface portions 124 and 126, respectively, formed on the opposite sides of the stanchion section 116 circumjacent the portions 120 and 122. The inboard ends of the cross rail sections 23a and 23b are rigidly secured to the stanchion member 112 by means of a pair of locking screws, bolts or the like (not shown) which extend upwardly from the lower sides of the sections 23a and 23b through suitable apertures 128 and 130 and lockingly engage the lower sides of the lug portions 120 and 122. Preferably the forward side of the stanchion section 116 is formed with a pair of inclined surface portions 132 and 134 which are substantially coplanar with the forward sides of the cross rail sections 23a and 23b, whereby to provide a pleasant appearing contour at the juncture of the sections 23a, 23b and stanchion 112.

The lower mounting section 114 of the stanchion member 112 extends longitudinally of the rack 10 and is preferably longitudinally aligned with the center base rail 20, the section 114 being rigidly secured to the roof portion 14 of the vehicle 12 by a suitable screw, bolt or the like 136 which extends downwardly through a suitable countersunk aperture 138 formed in the rear end of the section 114, as seen in FIGURE 7. The forward end of the aforesaid center base rail 20 preferably abuts against the rear end of the stanchion section 114 in the manner illustrated in FIGURES 4 and 7.

The outboard ends of the cross rail sections 23a and 23b are adapted to be supported on the forwardmost ends of the side rails 16 and 18, respectively, by means of a pair of the hereinbefore described retainer brackets 80 which, together with a pair of forwardly extending end caps generally designated 140, are rigidly connected to the forward ends of the side rails 16 and 18. More particularly and as best illustrated in FIGURE 6, the outboard end of the cross rail section 23a is adapted to have the laterally inwardly projecting lug portion 82 of its associated retainer bracket 80 inserted therewithin, the outboard end of the rail section 23a being cut at a predetermined angle so as to contiguously engage the flat shoulder 84 formed on the retainer bracket 80 around the outboard end of the lug portion 82. The lug portion 82 is formed with an inclined rearwardly directed face portion 142 which is disposed at an angle relative to the shoulder 84 so as to tightly engage the adjacent inner peripheral portion of the outboard end of the cross rail section 23a. A suitable locking screw, bolt or the like (not shown), extends upwardly through a suitable aperture 144 formed in the lower side of the cross rail section 23a and threadedly engages a suitable aperture 146 on the lower side of the lug portion 82, whereby to rigidly secure the section 23a and bracket 80 together.

It will be seen that the retaining bracket 80, shown in FIGURE 6, is reversed with respect to the bracket 80 described in connection with the rear cross rail 20 and shown in FIGURE 8; that is, the section 92 of the bracket 80 in FIGURE 6 extends rearwardly along the inboard side of the side rail 16 instead of forwardly as does the section 92 of the bracket 80 in FIGURE 8. It will be seen, however, that the boss portions 94 and 96 of the bracket 80 in FIGURE 6 are adapted to be nested within the opening 32 defined between the upper and lower flange sections 34 and 36 of the side rail 16 in the same manner that the boss portions of the bracket 80 in FIGURE 8 fit within the opening 32. As seen in FIGURE 6, bracket 80 is rigidly secured to the forward end of the side rail 16 by means of a suitable countersunk screw 148 that extends through an opening, which is similar to the opening 104 shown in FIGURE 8, in the boss portion 96 and threadably engages the central bore 150 formed in a rectangular shaped slide member 152 that is slidably carried in the grooves 38 and 40 of the side rail 16 and is identical in construction to the aforedescribed slide member 110 described in connection with FIGURE 8. It will be noted that the screw 148 is not provided with a knurled head section as is the screw 106 since the bracket 80 and cross rail section 23a are not intended to be longitudinally adjusted relative to the side rail 16. It will also be noted that the boss portion 94 of the bracket 80 is not provided with a slide washer as is the aforedescribed boss portion 94 of the bracket 80 shown in FIGURE 8.

The end cap member 104 which is associated with the forwardmost end of the slide rail 16 is best shown in FIGURE 6 and comprises a forwardly projecting, generally pointed section 154 and a rearwardly extending mounting section 156, the latter of which terminates at its rearmost end in a generally L-shaped tang 158 which is adapted to be lockingly secured to the inboard side of the laterally outboard portion of the side rail 16 by one of the screws 48 utilized to secure the upper side rail engaging section 42 of the associated stanchion member 26 to the side rail 16, as hereinbefore described. The rearmost end 160 of the tang 158 extends transversely within the cavity 28 of the side rail 16 and preferably tightly engages the opposite sides thereof thus serves to further secure the end cap 140 to the forward end of the side rail 16. A medial portion of the laterally inboard side of the end cap member 140 is formed with a laterally inwardly projecting boss portion 162 which is laterally aligned with the lug portion 82 of the retainer bracket 80, the end cap 140 being rigidly secured to the retainer bracket 80 by means of an elongated bolt 164 which extends laterally through a suitable opening 166 in the inboard end of the lug portion 82 and is threaded within a suitable bore 168 in the boss portion 162. The inboard side of the forwardly projecting section 154 of the end cap 140 is formed with an inwardly projecting shoulder 170 which is adapted to engage the forward end of the retainer bracket 80, as best seen in FIGURE 6. The shoulder 170 and tang 158 are preferably formed such that a substantially smooth conformation is provided between the outboard side of the side rail 16, the forward side of the retainer bracket 80 and the opposite sides of the cross rail section 23a, whereby to provide substantially smooth surfaces at the juncture of the members 16, 80, 140 and 23a.

It will be seen from the above description that the end cap member 140, retainer bracket 80, side rail 16, cross rail section 23a and stanchion 26, are secured together at the forward outboard edge of the luggage rack 10 in a manner such that a minimum number of fastening means, i.e., screws, bolts and the like are exposed, thereby substantially enhancing the appearance of the luggage rack 10 of the present invention.

It may also be noted that with the present design, the conformation of the end caps 140 may be changed slightly from year to year without requiring any changes in the rest of the component members of the luggage rack 10, whereby to provide for annual design variations in accordance with automotive vehicle model changes.

As illustrated in FIGURES 1, 2 and 18, the luggage rack 10 is provided with an elongated wind deflector, generally designated 172, which extends laterally across the rear end of the rack 10 directly above and slightly rearwardly of the rear window 174 of the vehicle 12. The wind deflector 172 is slightly arcuate in transverse section and is preferably constructed of a substantially rigid non-corrosive material such as aluminum, stainless steel, plastic, or the like. The deflector 172 is adapted to be secured to the rear end of the luggage rack 10 by means of a pair of laterally spaced support brackets, generally designated by the numeral 176, which are mounted on the rear ends of the side rails 16 and 18. More particularly, the brackets 176, one of which is illustrated in FIGURE 18, comprise downwardly tapered sections 178 which are adapted to be secured to the forwardmost side of the wind deflector 172 by means of suitable screws, bolts, or the like 180. The sections 178 terminate at their upper ends in longitudinally extending mounting sections 182 which have substantially the same outer conformation or cross sectional shape as the exterior of the side rails 16 and 18. The forwardmost ends of the mounting sections 182 are formed with integral tongue sections 184, as best seen in FIGURE 8, which are of an identical configuration in transverse cross section to the central cavity 28, opening 32, and grooves 34 and 36 of the side rails 16 and 18, as best seen in FIGURE 14, these tongue sections 184 thereby being adapted to be inserted within the rear ends of the side rails 16 and 18 in the manner illustrated in FIGURE 8. The brackets 176 are formed with substantially flat shoulder portions 186 around the tongue sections 184, which portions 186 are adapted to abut against the rear ends of the side rails 16 and 18. The brackets 176 and hence the wind deflector 172 are adapted to be rigidly secured to the rear end of the luggage rack 10 by means of a plurality of suitable screws, bolts or the like 187 which extend upwardly through suitable openings 188 in the lower sides of the side rails 16 and 18 and thread- ably engage suitable apertures 190 in the tongue sections 184 of the brackets 176.

Figure 21:
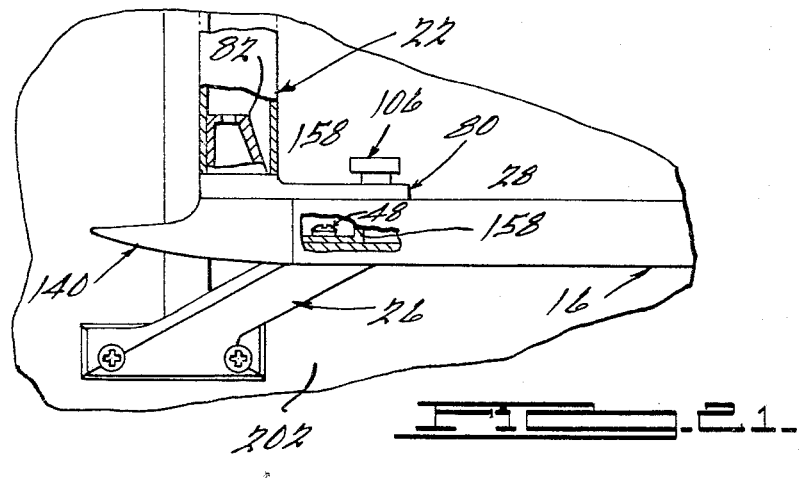
FIGURE 21 is a top elevational view of the structure illustrated in FIGURE 20.
Figure 20:
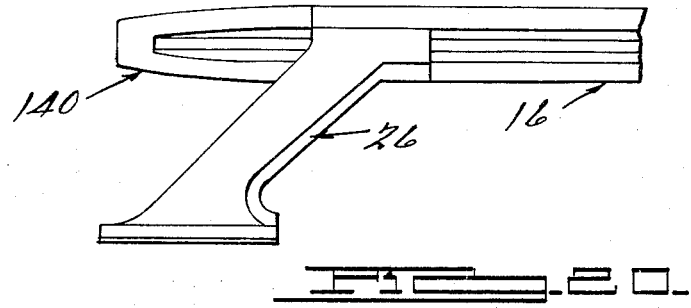
FIGURE 20 is a fragmentary side elevational view of an end portion of the modified luggage rack construction illustrated in FIGURE 14.
Figure 19:
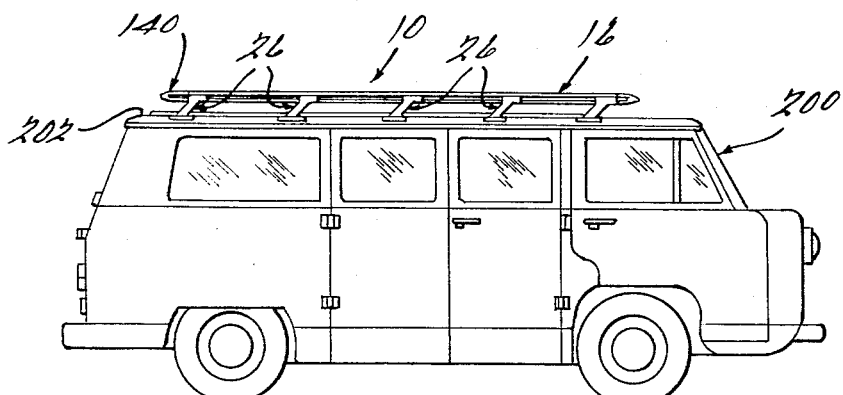

Referring now to FIGURES 19 through 21, a slightly modified construction of the luggage rack 10 of the present invention is shown operatively mounted on a panel-type truck vehicle 200 having a substantially flat, elongated roof portion 202, the construction of the luggage rack 10 being substantially identical to that hereinbefore described with the exception that a plurality of stanchions 26 are utilized to support each of the side rails 16 and 18 on the roof portion 202, and that the provision of the wind deflector 172 is omitted. It will be apparent, of course, that the additional stanchions 26 which are provided for the support of each of the side rails 16 and 18 are adapted to be rigidly secured to the roof portion 202 and to the side rails 16 and 18 in a manner identical to that described hereinbefore.

Due to the fact that the modified construction of the luggage rack 10 of the present invention is not provided with the aforedescribed wind deflector 172 and hence not with the wind deflector mounting brackets 176, a pair of the hereinbefore described end caps 140 are provided on the rear ends of the side rails 16 and 18 and are secured thereto by having their L-shaped tang sections 158 secured within the cavities 28 of the side rails 16 and 18 by the screws 48 used for securing the rearmost stanchions 26 to the side rails 16 and 18, as hereinabove described. In the instant embodiment of the luggage rack 10, the rear cross rail 22 is supported by a pair of the above-described retainer brackets 80 which are adjustably secured to the side rails 16 and 18 by means of suitable knurled screws 106 that threadably engage a pair of slide members (not shown) which are longitudinally slidable within the grooves 38 and 40 of the side rails 16 and 18. The cross rail 22 is adapted to be rigidly secured to the lug portion 82 of the retainer bracket 80 by means of a suitable locking screw (not shown) which extends upwardly through a suitable aperture in the lower side of the cross rail 22 and threadably engages the lug portion 82 in a manner identical to that shown in FIGURE 8. It will be noted that the lug portions 82 of the retainer brackets 80 are not secured to the end caps 140 as was the case with the bracket 80 and end cap 140 described in connection with FIGURE 6, thus permitting the retainer brackets 80 and the rear cross rail 22 supported thereby to be longitudinally slidable relative to the end caps 140 and side rails 16 and 18. Accordingly, the cross rail 22 may be longitudinally adjusted to vary the size of the space bounded by the cross rail 22 and side rails 16 and 18 in accordance with the size and type of load to be transported within the luggage rack 10.

Referring now to FIGURES 22 and 23, another slightly modified construction of the luggage rack 10 of the present invention comprises a pair of longitudinally extending spaced parallel side rails which are similar in construction to the aforedescribed side rails 16 and 18 and one of which is illustrated herein and designated by the numeral 204. The side rail 204 is generally tubular in transverse cross section and defines an elongated central cavity 206. The outboard side of the rail 204 is formed with a longitudinally extending, generally V-shaped channel 208 which is preferably identical in configuration to the channels 30 in the above-described side rails 16 and 18 so that the side rail 204 may be supported upon the roof portion of an automotive vehicle or the like by the same stanchion members 26 utilized to support the above-described side rails 16 and 18. Accordingly, the side rail 204 is shown rigidly secured to one of the aforedescribed stanchion members 26 by a suitable screw, bolt or the like 210 in a manner identical to that shown in FIGURE 11. The inboard side of the side rail 204 is generally cylindrical in conformation about an axis extending longitudinally of the side rail 204. An opening 212 is formed in the inboard side of the rail 204, which opening 212 is coextensive of the rail 204 and is communicable with the central cavity 206.

The side rail 204 is adapted to support one end of one or more laterally extending cross rails for longitudinal sliding movement, one of which rails is illustrated in FIGURES 22 and 23 and designated by the numeral 214. Preferably the cross rail 214 is identical in construction to the cross rails 22 and 23 previously described. The outboard end of the cross rail 214 is adapted to be secured to the inboard side of the side rail 204 by means of an elongated retainer plate, generally designated 216 and best seen in FIGURE 22. The retainer plate 216 is somewhat cylindrical in transverse section and is thereby adapted to contiguously engage the outer periphery of the inboard side of the side rail 204 as illustrated. The medical or central section of the retainer plate 216 is formed with a laterally inwardly projecting embossed portion 218 which defines a substantially flat surface 220 against which the outboard end of the cross rail 214 is adapted to engage or abut. The central section of the embossed portion 218 is in turn formed with a laterally inwardly projecting embossed portion 222 which is preferably axially aligned with the axis of the cross rail 214. The retainer plate 216 is rigidly secured to the end of the cross rail 214 by means of a suitable screw, bolt or the like 224 which extends through a central opening 226 in the embossed portion 222 and threadably engages a suitable opening 228 in a plug member 230 which is press fitted or similarly secured within the end of the cross rail 214, as best seen in FIGURE 23.

The retainer plate 216 is adapted to be secured to the inboard side of the side rail 204 by means of a pair of suitable screws, bolts or the like 232 which extend laterally outward through the opening 212 in the side rail 204 and are threaded within suitable openings 234 in a tapping plate 236 which extends longitudinally within the cavity 206 and is of substantially the same length as the retainer plate 216. As best seen in FIGURE 22, the laterally inboard side of the tapping plate 236 is arcuate in shape to conform with the inner periphery of the laterally inboard side of the side rail 204. It will be seen from the construction thus described, that upon tightening the screws 232, the tapping plate 236 and retainer plate 216 compress the adjacent portions of the inboard side of the side rail 204, whereby to lockingly secure the cross rail 214 at a preselected longitudinal position along the side rail 204; however, upon loosening the screws 232, the cross rail 214 may be moved longitudinally relative to the side rail 204 for the purpose of adjustment, as above described. Furthermore, at such time as the screws 232 are loosened, the cross rail 214 may be pivoted either upwardly or downwardly relative to the side rail 204 and stanchion 26 secured thereto, as illustrated by the phantom lines in FIGURE 22, whereby to provide for limited angular adjustment of the side rail 204 and stanchion 26 relative to the outboard end of the cross rail 214. With this construction, the cross rail 214 and side rail 204 may be appropriately adjusted such that the cross rail 214 extends substantially horizontally across the roof portion of the associated automotive vehicle regardless of the particular conformation or contour of the roof portion to which the lower end of the stanchion member 26 is operatively secured, hence, the above construction provides for universality of installation of the luggage rack 10 of the present invention.

Referring now to FIGURES 24 and 25, in a construction of the luggage rack of the present invention which is slightly modified from that shown in FIGURES 22 and 23, there is provided a side rail 204, stanchion 26, cross rail 214, tapping plate 236, and plug member 230, all of which members are identical in construction and operation to the component members designated by like numerals in FIGURES 22 and 23. The luggage rack construction shown in FIGURES 24 and 25 also includes a retainer plate 238 which is of substantially the same construction as the aforedescribed retainer plate 216, with the exception that a pair of laterally inwardly projecting ear portions 240 and 242 are formed in the embossed medial section 218 instead of the embossed portion 222. As best seen in FIGURE 25, the ear portions 240 and 242 are generally arcuate in shape and are designed such that the upper and lower surfaces 244 and 246 thereof, respectively, contiguously engage the inner periphery of the interior surfaces of the cross rail 214. The plate 238 is secured to the end of the cross rail 214 by means of a suitable bolt 248 which extends through a washer 250 disposed in the portion 218 and is threaded within the plug 230. The plate 238 is connected to the tapping plate 236 by the bolts 232, as above described. With this construction, the cross rail 214 may be rotated slightly along its longitudinal axis, as seen by the phantom lines in FIGURE 25, together with being longitudinally adjustable and angularly adjustable in the same manner as described in connection with FIGURES 22 and 23. Accordingly, the cross rail 214 may be rotatably adjusted to the optimum position wherein objectionable wind noise, which may be produced during operation of the automotive vehicle to which the luggage rack is attached, is reduced to a minimum.

It will be seen from the foregoing description that the present invention provides a novel luggage rack wherein two or more stanchion members may be utilized to operatively mount the side rails thereof, which stanchion members may be secured to the side rails at any desired longitudinal position. It will also be seen that the present invention provides a luggage rack which is adapted to be operatively mounted on vehicle roof portions of various conformations or contours. Furthermore, the luggage rack of the present invention may be easily installed in a manner such that the various fastening means, i.e., screws, bolts or the like, incorporated therein, are substantially hidden from view, whereby to enhance the appearance of the rack. Preferably, the various side rails, cross rails and base members hereinabove described are fabricated of extruded aluminum or a similar lightweight, noncorrosive material, resulting in the luggage rack requiring relatively low cost tooling, such a construction also minimizing the structurally accrued weight and providing a corrosion-resistant assembly which is extremely pleasant in appearance. Toward this end, transversely extending grooves 252 may be provided in the various cross rails 22, 23, and 214, which grooves may be painted or similarly decorated.

While it will be apparent that the embodiments herein illustrated are well calculated to fulfill the objects above stated, it will be appreciated that the luggage rack 10 of the present invention is susceptible to modification, variation and change without departing from the proper scope or fair meaning of the subjoined claims.

What is claimed is:
1. In a rack for carrying luggage or the like on an automotive vehicle,
    a pair of longitudinally extending spaced parallel side members,
    at least one cross member extending laterally between said side members,
    a plurality of stanchion members each having a portion secured to the vehicle and a portion secured to said side members for supporting the rack on the vehicle,
    said side members and said stanchion members having matingly engageable surface portions whereby said stanchion members may be secured to said side members at any longitudinal position thereon,
    means movably interconnecting said cross member and said side members whereby said side members are rotatable relative to said cross member about axes extending substantially at right angles to said cross member, and
    means for movably securing said cross member to said side members for limited rotative movement about an axis extending parallel to said cross member.

2. In a rack for carrying luggage or the like on an automotive vehicle,
a pair of longitudinally extending spaced parallel side members,
said side members having hollow end portions and laterally outwardly directed channel portions,
a plurality of stanchion members for supporting the rack on the vehicle,
said stanchion members having portions engageable with said channel portions, and
a plurality of end cap members each including a mounting section insertable within said end portions of said side members.

3. The invention as set forth in claim 2 which includes wind deflecting means extending transversely between said side members.

4. In a rack for carrying luggage or the like on an automotive vehicle,
a pair of longitudinally extending spaced parallel side members having longitudinally extending channels formed therein and having substantially hollow end portions,
a plurality of stanchion members each having a lower portion secured to the vehicle and an upper portion engageable with said channels in said side members,
a plurality of end caps having tang portions disposed within the hollow end portions of said side rails and portions extending longitudinally away from said side rails, and
means for securing said upper portions of said stanchion members and said tang portions of said end caps to said side members.

5. In a rack for carrying luggage or the like on an automotive vehicle,
a pair of longitudinally extending spaced parallel side members having longitudinally extending channels formed therein and having substantially hollow end portions,
a plurality of stanchion members each having a lower portion secured to the vehicle and an upper portion engageable with said channels in said side members,
a plurality of end caps having portions fixedly secured within the hollow end portions of said side rails and portions extending longitudinally away from said side rails,
a plurality of cross members extending laterally between said side members,
a pair of retaining brackets rigidly secured to the opposite ends of each of said cross members, and
means for securing the opposite ends of said one cross member to the end caps mounted on the adjacent ends of said side members.

6. The invention as set forth in claim 5 wherein one of said cross members and one pair of said retaining brackets are longitudinally slidable relative to said end caps and said side members.

7. In a rack for carrying luggage or the like on an automotive vehicle,
a pair of longitudinally extending spaced parallel side members having longitudinally extending channels formed therein,
a plurality of stanchion members each having a portion secured to the vehicle and a portion engageable with said channels in said side members for supporting the rack on the vehicle,
each of said side members defining a longitudinally extending central cavity,
slideway means longitudinally slidable within said cavities of said side members,
at least one cross member extending laterally between said side members, and
means on the opposite ends of said cross member connectible to said slideway means for securing said cross members for longitudinally sliding movement and for pivotable movement about axes extending parallel to said side members.

8. In a rack for carrying luggage or the like on an automotive vehicle,
a pair of longitudinally extending spaced parallel side members,
at least one cross member extending laterally between said side members,
means for movably securing said cross member to said side members for limited rotative movement about an axis extending parallel to said cross member,
means for movably securing said side members to said cross member for universal movement about axes extending substantially parallel to said side members, and
a plurality of stanchion members engageable with said side members whereby said stanchion members may be secured to said side members at any longitudinal position thereon.

9. In a rack for carrying luggage or the like on an automotive vehicle,
a pair of longitudinally extending spaced parallel side members having hollow end portions,
at least one cross member extending laterally between said side members,
means for movably securing said cross members to said side members for limited rotative movement about an axis extending parallel to said cross member,
means for movably securing said side members to said cross member for universal movement about axes extending parallel to said side members,
a plurality of stanchion members each having an upper portion of a complementary conformation to surface portions on said side members whereby said stanchion members may be secured to said side members at any longitudinal position thereon,
a plurality of end caps having first portions engaged with end portions of said side rails and second portions extending longitudinally away from said side rails, and
means disposed within the interior of said side members for rigidly securing said upper portions of said stanchion members and said first portions of said end caps to the ends of said side members.

10. In a rack for carrying luggage or the like on an automotive vehicle,
a pair of longitudinally extending spaced parallel side members,
said side members having hollow end portions and channel portions,
a plurality of stanchion members for supporting the rack on the vehicle,
said stanchion members each having a portion engageable with said channel portions,
a plurality of end cap members each including a mounting section insertable within the end of one of the side members,
a wind deflector extending transversely between said side members adjacent the rear end of the rack and adapted to deflect a flow of wind toward a rear portion of the automotive vehicle,
at least one cross member extending laterally between said side members,
means movably interconnecting said cross member and said side members whereby said side members are rotatable about axes extending substantially at right angles to one of said members.

11. In a rack for carrying luggage or the like on an automotive vehicle, a pair of longitudinally extending spaced parallel side members, each of said side members having a longitudinally extending outwardly directed channel formed therein, a plurality of stanchion members for supporting the rack on the vehicle and each comprising a first portion secured to the vehicle and a secured portion adapted to be received within the channel of one of said side members, at least one cross member extending laterally between said side members, means for movably securing said cross member to said side members for limited rotative movement about an axis extending parallel to said cross member, and means for movably securing said side members to said cross member for universal movement about axes extending parallel to said side members.

12. The invention as set forth in claim 11 which includes means supporting said cross member on said side members for longitudinally sliding movement relative to said side members.

13. In a rack for carrying luggage or the like on an automotive vehicle,
  a pair of longitudinally extending spaced parallel side members,
  each of said side members having a hollow end portion at the rear end thereof,
  a wind deflector extending transversely between said side members adjacent the rear ends of the rack and adapted to direct a flow of wind toward a portion of the vehicle, and
  bracket members having portions received within said hollow end portions of said side members and secured to said side members, said bracket members being operable to support said wind deflector adjacent the opposite ends thereof.

14. In a rack for carrying luggage or the like on an automotive vehicle,
  a pair of laterally extending spaced parallel side members having longitudinally extending laterally outwardly directed channels formed thereon,
  at least on cross-member extending transversely between said side members,
  a plurality of stanchion members each having a portion secured to the vehicle and a portion engageable with the channel of one of said side members for supporting the rack on the vehicle, whereby said stanchion members may be secured to said side members at any longitudinal position thereon, and
  means on the opposite ends of said cross member and cooperable means on the laterally inner sides of said side members for securing said cross member to said side members in a manner such that said cross member may be adjusted longitudinally of said side members without interfering with said stanchion members.

15. In a rack for carrying luggage or the like on an automotive vehicle,
  a pair of laterally extending spaced parallel side members having longitudinally extending laterally outwardly directed channel formed thereon,
  at least one cross member extending transversely between said side members,
  a plurality of stanchion members each having a portion secured to the vehicle and a portion engageable with the channel of one of said side members for supporting the rack on the vehicle, whereby said stanchion members may be secured to said side members at any longitudinal position thereon,
  bracket means on the opposite ends of said cross member,
  channel defining means extending longitudinally of said side members on the laterally inner sides thereof, and
  slideway means connectable to said bracket means and longitudinally slidable within said channel defining means, whereby said cross member may be adjusted longitudinally of said side members without interfering with said stanchion members.

16. In a rack of carrying luggage or the like on an automotive vehicle,
  a pair of longitudinally extending spaced parallel side members,
  a plurality of stanchion members for supporting the rack on the vehicle,
  a wind deflector extending transversely between said side members adjacent the back end of the rack and adapted to direct a flow of wind toward a rear portion of the automotive vehicle, and
  end cap means mounted on and extending rearwardly from said side members for securing said wind deflector thereto.

17. In a rack for carrying luggage or the like on an automotive vehicle,
  a pair of longitudinally extending spaced parallel side members,
  a plurality of stanchion members for supporting the rack on the vehicle,
  a wind deflector extending transversely between said side members adjacent the back end of the rack and adapted to direct a flow of wind toward a rear portion of the automotive vehicle, and
  end cap means mounted on and extending rearwardly from said side members and comprising the sole means for cantilever supporting said wind deflector on said side members.

References Cited
UNITED STATES PATENTS

| 2,475,903 | 7/1949  | Klas            | 224—42.1   |
| 2,596,860 | 5/1952  | McCrory et al.  | 224—42.1   |
| 2,645,391 | 7/1953  | Lecanu-Deschamps| 224—42.1   |
| 2,698,119 | 12/1954 | Cicogna         | 224—42.1 X |
| 2,853,119 | 9/1958  | Balfour         | 224—42.1   |
| 2,919,841 | 1/1960  | Helm            | 224—42.1   |
| 3,061,256 | 10/1962 | Feinstein et al.| 224—42.1 X |
| 3,097,882 | 7/1963  | Andrews         | 224—42.1 X |
| 3,120,914 | 2/1964  | Smith           | 224—42.1   |

FOREIGN PATENTS

| 171,229   | 5/1952  | Austria. |
| 1,061,457 | 11/1953 | France.  |
| 1,092,494 | 11/1954 | France.  |
| 681,156   | 3/1964  | Canada.  |

GERALD M. FORLENZA, *Primary Examiner.*

F. WERNER, *Assistant Examiner.*